United States Patent
Ostrovsky et al.

(10) Patent No.: US 11,916,370 B2
(45) Date of Patent: Feb. 27, 2024

(54) APPARATUS, SYSTEMS AND METHODS FOR PERFORMING GROUND FAULT SELF-TESTING

(71) Applicant: Leviton Manufacturing Co., Inc., Melville, NY (US)

(72) Inventors: Michael Ostrovsky, Brooklyn, NY (US); John LiBretto, Massapequa, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 219 days.

(21) Appl. No.: 17/298,830

(22) PCT Filed: May 28, 2021

(86) PCT No.: PCT/US2021/034705
§ 371 (c)(1),
(2) Date: Jun. 1, 2021

(87) PCT Pub. No.: WO2021/243116
PCT Pub. Date: Dec. 2, 2021

(65) Prior Publication Data
US 2022/0216687 A1    Jul. 7, 2022

Related U.S. Application Data

(60) Provisional application No. 63/032,288, filed on May 29, 2020.

(51) Int. Cl.
*H02H 3/33* (2006.01)
*H02H 3/16* (2006.01)

(52) U.S. Cl.
CPC .............. *H02H 3/335* (2013.01); *H02H 3/16* (2013.01)

(58) Field of Classification Search
CPC ................................ H02H 3/335; H02H 3/16
See application file for complete search history.

(56) References Cited

U.S. PATENT DOCUMENTS 6,262,871 B1 *  7/2001  Nemir .................. G01R 31/327
                                                    324/424
7,440,246 B2    10/2008  Bonasia et al.
(Continued)

OTHER PUBLICATIONS

International Search Report and Written Opinion issued in corresponding International Application No. PCT/US21/34705, dated Sep. 30, 2021, pp. 1-17.

(Continued)

*Primary Examiner* — Scott Bauer
(74) *Attorney, Agent, or Firm* — George Likourezos; Carter, DeLuca & Farrell LLP

(57) ABSTRACT

A circuit interrupter device for selectively connecting a source of AC power from a line side to a load side of the circuit interrupter device includes a controller powered from a source of AC power from a line side. The controller initializes a self-test and determines whether the self-test was successful. The controller outputs a self-test result signal. An electrically-held relay of the device, which is in communication with the controller and is powered from the line side, stays in an OFF state until the self-test result signal indicates the self-test was successful, and enters an ON state if the self-test was successful. When in the OFF state, a load side of the circuit interrupter device is not in electrical communication with the source of AC power, and when in the ON state, the load side is in electrical communication with the source of AC power.

28 Claims, 8 Drawing Sheets

(56) References Cited

U.S. PATENT DOCUMENTS

| | | | |
|---|---|---|---|
| 7,852,607 | B2 | 12/2010 | Radosavljevic et al. |
| 7,911,746 | B2 | 3/2011 | Zaretsky et al. |
| 8,085,516 | B1* | 12/2011 | Armstrong ............. H02H 3/335 |
| | | | 361/45 |
| 8,547,126 | B2 | 10/2013 | Ostrovsky et al. |
| 9,685,293 | B1* | 6/2017 | Watford ................. H01H 71/62 |
| 9,709,626 | B2 | 7/2017 | Ostrovsky et al. |
| 9,759,758 | B2 | 9/2017 | Ostrovsky et al. |
| 9,857,448 | B1 | 1/2018 | Li |
| 10,069,292 | B2 | 9/2018 | Li et al. |
| 2001/0033468 | A1 | 10/2001 | Macbeth |
| 2007/0030607 | A1 | 2/2007 | Liscinsky |
| 2007/0035898 | A1* | 2/2007 | Baldwin ................ H02H 3/335 |
| | | | 361/42 |
| 2011/0216453 | A1 | 9/2011 | Haines et al. |
| 2011/0222194 | A1 | 9/2011 | Kinsel et al. |
| 2014/0266272 | A1* | 9/2014 | Beck ...................... H02H 3/335 |
| | | | 324/750.3 |
| 2014/0278157 | A1 | 9/2014 | Simonin |
| 2015/0309103 | A1 | 10/2015 | Ostrovsky et al. |
| 2017/0322254 | A1 | 11/2017 | Ostrovsky et al. |
| 2018/0024179 | A1 | 1/2018 | Ostrovsky et al. |
| 2018/0261993 | A1* | 9/2018 | Kurniawan ............ H02H 3/162 |
| 2018/0299499 | A1 | 10/2018 | Seidler et al. |
| 2023/0094418 | A1* | 3/2023 | Zheng ................. H02H 11/005 |
| | | | 361/52 |

OTHER PUBLICATIONS

International Preliminary Report on Patentability and Written Opinion issued by the International Bureau of WIPO in connection with International Application No. PCT/US2021/034705, dated Nov. 17, 2022.

* cited by examiner

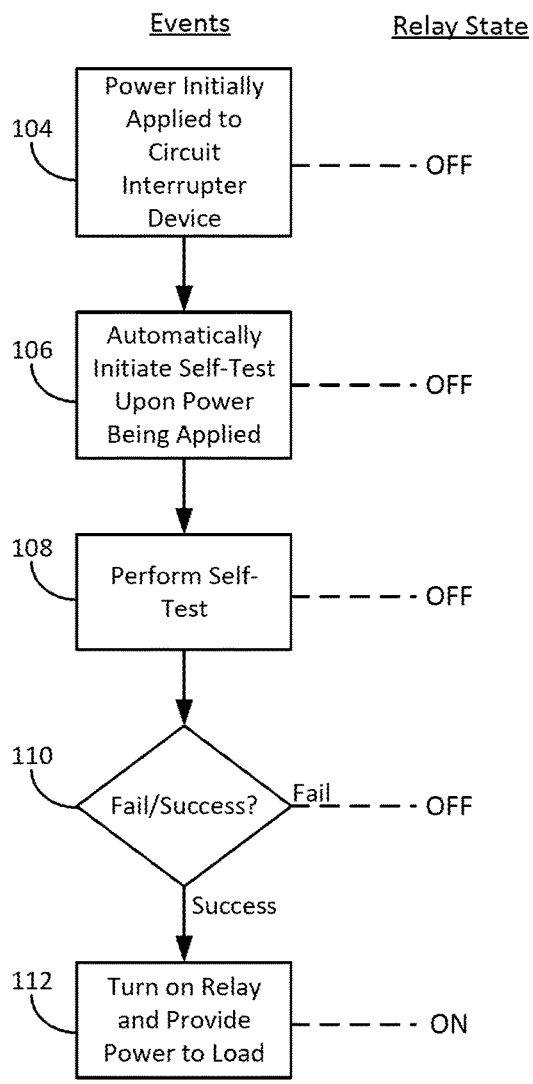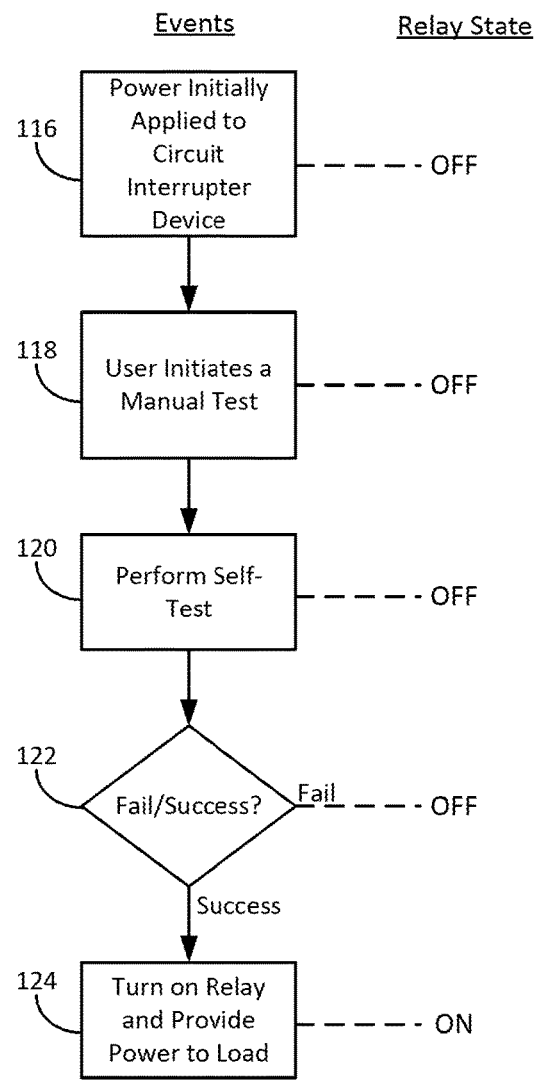
Fig. 1A
Fig. 1B

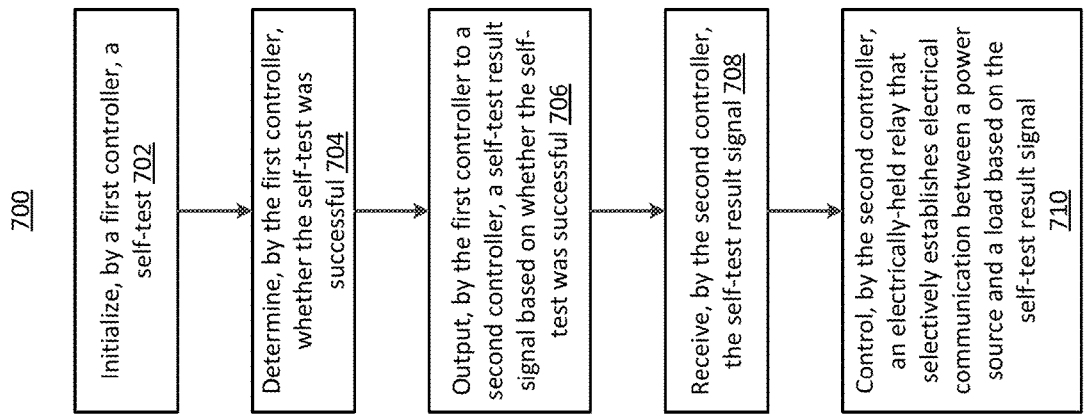

APPARATUS, SYSTEMS AND METHODS FOR PERFORMING GROUND FAULT SELF-TESTING

CROSS-REFERENCE TO RELATED APPLICATION

This application claims priority to U.S. Provisional Application No. 63/032,288, filed on May 29, 2020, which is hereby incorporated by reference herein in its entirety as if set forth fully herein.

FIELD OF THE DISCLOSURE

This disclosure generally relates to apparatuses, systems, and methods for performing ground fault self-testing.

BACKGROUND OF THE DISCLOSURE

Electronic devices can include or be coupled with ground-fault circuit interrupters (GFCIs) to shut off electric power to a load in the event of a ground fault. For example, a GFCI can compare phase current in a phase conductor with neutral current in a neutral conductor to determine a difference between the phase and neutral currents. If the GFCI detects a difference, the GFCI can shut off electric power to the load. If the GFCI does not detect a difference, then the GFCI can provide electric power to the load.

BRIEF SUMMARY OF THE DISCLOSURE

Electronic devices configured with a GFCI can turn on or off electric power to a load responsive to detecting a ground fault, such as a difference between an input current and an output current that is greater than a threshold. However, GFCIs may either always stay off after being plugged in to electric power, or turn on automatically after being plugged in to electric power. To maintain a state of the GFCI, portable GFCIs can use electrically held relays, which may include additional hardware to implement self-testing features. However, when electrically held relays are reset, the electrically held relay may enter a default state that may be improper given a state of the circuit of the device. Thus, systems, methods and apparatus of this technical solution can provide a device that implements an electrically held relay that appropriately manages a state of the electrically held relay using ground fault self-testing. This technical solution can include a latching relay designed to maintain an ON or OFF state without using power to maintain the state.

At least one aspect of this technical solution is directed to a circuit interrupter device for selectively connecting a source of AC power from a line side to a load side of the circuit interrupter device. The circuit interrupter device can include a controller powered by the source of AC power from the line side. The controller can initialize a self-test. The controller can determine whether the self-test was successful. The controller can output a self-test result signal based on whether the self-test was successful. The circuit interrupter device can include an electrically-held relay having an ON state and an OFF state. The electrically-held relay can be in electrical communication with the controller. The electrically-held relay can remain in the OFF state until the self-test result signal indicates the self-test was successful. The electrically-held relay can transition to the ON state if the self-test result signal indicates the self-test was successful. When the electrically-held relay is in the OFF state, the load side of the circuit interrupter device is not in electrical communication with the source of AC power. When the electrically-held relay is in the ON state, the load side of the circuit interrupter device is in electrical communication with the source of AC power.

In some aspects, the circuit interrupter device can include a differential sensor configured to detect a current imbalance. The self-test can be determined to have been successful if a simulated current imbalance is detected by the differential sensor. In some aspects, the circuit interrupter device can include a plurality of electrically conductive paths. The differential sensor can detect the current imbalance between the plurality of electrically conductive paths. The electrical communication between the source of AC power and the load side of the circuit interrupter device can be established by the plurality of electrically conductive paths, wherein the self-test further comprises creating a simulated current imbalance between the plurality of electrically conductive paths.

In some aspects, the circuit interrupter device can include two controllers, such as a first controller and a second controller that is in electrical communication with the first controller. The first controller can initialize the self-test and determine whether the self-test was successful. The first controller can output the self-test result signal based on whether the self-test was successful. The second controller can receive the self-test result signal from the first controller. If the self-test was successful, the second controller can cause the electrically-held relay to enter the ON state. In some aspects, the first controller can initialize the self-test responsive to receiving a test initiation signal. In some aspects, the second controller can output a test initiation signal to the first controller upon receiving an input from a user, wherein the test initiation signal causes the first controller to initiate the self-test.

In some aspects, the circuit interrupter device can include a user-accessible button operatively coupled to the second controller. An input from a user can be an actuation of the user-accessible button.

The circuit interrupter device can include a filter circuit in electrical communication with the first controller and the second controller. The filter circuit can receive the self-test result signal from the first controller. The filter circuit can filter the self-test result signal, and output the filtered self-test result signal to the second controller.

The circuit interrupter device can include a housing, and the circuit interrupter device can be at least partially disposed within the housing. The circuit interrupter device can include an electrical plug configured to selectively establish electrical communication between the circuit interrupter device and the source of AC power.

The controller can initialize the self-test upon establishment of electrical communication between the line side of the circuit interrupter device and the source of AC power. The controller can initialize the self-test periodically.

In some aspects, the circuit interrupter device can include a first switching element and a second switching element electrically coupled in series with the first switching element. The electrically-held relay can be electrically coupled in series with one of the first switching element or the second switching element. The controller can control the electrically-held relay by energizing the first switching element, the second switching element, or both the first and second switching elements. Upon failure of the first switching element, the second switching element, or both the first and second switching elements, the electrically held relay can be maintained in its OFF state.

In some aspects, the circuit interrupter is mounted on a panel. The circuit interrupter can include a voltage measurement circuit configured to measure a magnitude of voltage of the AC power. The AC power AC power is removed when the measured magnitude is lower than a lower limit or greater than an upper limit.

At least one aspect of this disclosure is directed to an apparatus to perform ground fault self-testing. The apparatus can include a first controller. The first controller can be powered from a source of AC power from a line side. The first controller can receive, from a second controller, a signal to initialize a self-test. The first controller can determine that the self-test was successful. The first controller can output a successful self-test result signal to the second controller responsive to determining that the self-test was successful. The apparatus can include a plurality of switching elements. The apparatus can include an electrically-held relay in electrical communication with the plurality of switching elements. The second controller can be powered from the source of AC power from the line side. The second controller can output, to the first controller responsive to the system for performing ground fault self-testing powering on, the signal to initialize the self-test. The second controller can receive, from the first controller, the successful self-test result signal. The second controller can turn on the electrically-held relay that selectively establishes electrical communication between the source of AC power and a load based on the successful self-test result signal. The electrically-held relay can be powered from the source of AC power from the line side and selectively establish electrical communication between the source of AC power and the load if at least one of the plurality of switching elements is operational.

In some aspects, the apparatus can include a differential sensor configured to detect a current imbalance. The self-test is determined to have been successful if a simulated current imbalance is detected by the differential sensor.

The apparatus can include a reset-and-test button. The second controller can monitor a state of the reset-and-test button. The output of the successful self-test result signal to the second controller responsive to the determination that the self-test was successful can include outputting the signal to initialize the self-test responsive to a determination that the state of the reset-and-test button is that the reset-and-test button has been depressed.

The apparatus can include a first visual indicator that indicates that the self-test was successful. The apparatus can include a second visual indicator that indicates that the self-test was not successful. In some aspects, the first visual indicator can include a green light-emitting diode (LED), and the second visual indicator can include a red LED.

The apparatus can include a first switching element and a second switching element both connected in series to the electrically-held relay. The second controller can control the electrically-held relay using the first switching element and the second switching element.

At least one aspect of this disclosure is directed to a method for selectively connecting a source of AC power from a line side to a load side of a circuit interrupter device. The method can include one or more controllers of the circuit interrupter device initializing a self-test. The one or more controllers can be powered from the source of AC power from the line side. The method can include the one or more controllers determining whether the self-test was successful. The method can include the one or more controllers outputting a self-test result signal based on whether the self-test was successful. The method can include an electrically-held relay of the circuit interrupter device staying in an OFF state until the self-test result signal indicates the self-test was successful. The electrically-held relay can be in electrical communication with the one or more controllers and be powered from the source of AC power from the line side. When the electrically-held relay is in the OFF state, the load side of the circuit interrupter device is not in electrical communication with the source of AC power, and when the electrically-held relay is in the ON state, the load side of the circuit interrupter device is in electrical communication with the source of AC power. The method can include the electrically-held relay entering an ON state if the self-test result signal indicates the self-test was successful.

In some aspects, the one or more controllers can include a first controller and a second controller in electrical communication with the first controller. The method can include the first controller initializing the self-test. The method can include the first controller determining whether the self-test was successful. The method can include the first controller outputting the self-test result signal based on whether the self-test was successful. The method can include the second controller receiving the self-test result signal from the first controller. The method can include the second controller causing, if the self-test was successful, the electrically-held relay to enter the ON state.

The method can include the first controller initializing the self-test responsive to receiving a test initiation signal. In some aspects, the method can include providing a housing. The circuit interrupter device can be at least partially disposed within the housing. The method can include providing an electrical plug configured to selectively electrically couple the circuit interrupter device to the source of AC power. In some aspects, the method can include periodically initializing, by the one or more controllers, the self-test.

At least one aspect of this disclosure is directed to a circuit interrupter device for selectively connecting a source of AC power from a line side to a load side of the circuit interrupter device. The circuit interrupter device can include a controller, powered by the source of AC power from the line side. The circuit interrupter device can include an electrically-held relay having an ON state and an OFF state. When the electrically-held relay is in the OFF state, the load side of the circuit interrupter device is not in electrical communication with the source of AC power. When the electrically-held relay is in the ON state, the load side of the circuit interrupter device is in electrical communication with the source of AC power. The circuit interrupter device can include a first switching element and a second switching element electrically coupled in series with the first switching element. The electrically-held relay is electrically coupled in series with one of the first switching element or the second switching element. The controller can control the electrically-held relay by energizing the first switching element, the second switching element, or both first and second switching elements.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 1A-1B illustrate event and state flows for automatic and manual-reset electrically-held relay devices, in accordance with aspects described herein.

FIG. 7 depicts a method for ground fault self-testing, in accordance with aspects described herein.

DETAILED DESCRIPTION

Figure 2:
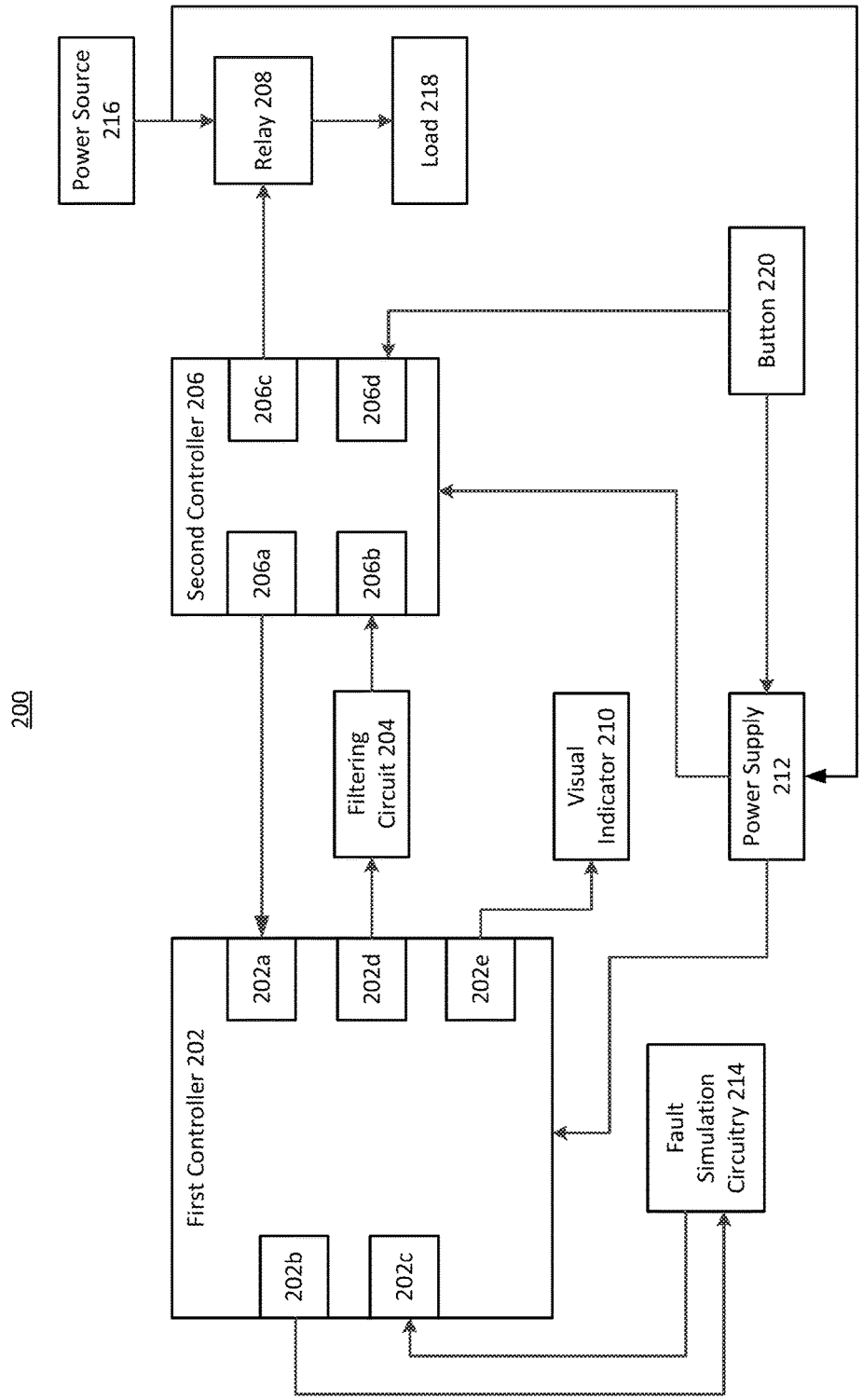
FIG. 2 is a block diagram showing a system for performing ground fault self-testing, in accordance with aspects described herein.

This disclosure provides systems, methods, and apparatus for performing ground fault self-testing (which may be referred to herein simply as a "self-test") for a device that implements electrically held relays. This disclosure can also apply to other types of circuit interrupters such as but not limited to arc fault circuit interrupters (AFCI's), appliance leakage circuit interrupters (ALCI's), equipment leakage circuit interrupters (ELCI's), ground fault protection of equipment (GFPE's), dual function or combination arc fault and ground fault circuit interrupters, or any suitable combination thereof.

Electronic devices configured with a GFCI can turn on or off electric power to a load responsive to detecting a ground fault. A ground fault refers to a leakage of current to ground which can potentially represent an electrical shock hazard. Typically, ground faults are detected by measuring a current differential between phase and neutral conductors that is greater than a threshold. Different types of electronic devices can be configured with different types of GFCIs. For example, an electronic device can use a portable GFCI that can provide a self-test capability. A GFCI with a self-test function can periodically and automatically test the ability of the GFCI circuitry to respond to a ground fault. When the self-test function detects a problem with the ability of the GFCI circuitry to respond to a ground fault, the GFCI can turn off (or deny) power to the load without generating an output signal, or provide a visual or audible indication of the detected problem. It is noted that the self-test or manual test capability is possible on a line power device but not on a load powered device. That means turning on a relay on the load powered device can be done by mechanical means and thus, testing on turning on in the load powered device is not possible.

A GFCI can use a latching relay to maintain a state of the GFCI when the electronic device is unplugged from electric power, and then plugged back in to electric power. Portable GFCIs, which may be used in construction or outdoor settings, are typically either manual reset or automatically reset. A manual reset portable GFCI will remain off after being plugged in to electric power until a user manually actuates the portable GFCI to provide power to the load. An automatic reset portable GFCI will turn on automatically after being plugged in to electric power without user intervention (assuming proper operation). To maintain a state of the GFCI, portable GFCIs can use electrically held relays, which may include additional hardware to implement self-testing features. However, GFCIs that shut off electric power to a load in the event of a ground fault may not perform as desired electrically held relays are used.

For example, electrically held relays can use power to maintain an ON state. If the power used to maintain the ON state is interrupted, the electrically held relays will change to or remain in the OFF state. Alternatively, the electrically held relay will change to or remain in the OFF state if the electrically held relay is an "always off" relay. A portable device that enters an incorrect or erroneous state may hold the relay ON when there is a problem (e.g., a ground fault or other fault), or hold the relay OFF when there is no problem with the circuit of the device. Therefore, electrically held relays may enter a default state that is improper, incorrect, or erroneous given a state of the circuit of the device.

Thus, systems, methods and apparatus of the present technical solution can provide a device that appropriately manage a state of the electrically held relay using self-testing. Other technical solutions can alternatively include a latching relay designed to maintain an ON or OFF state without using power to maintain the state.

The system of this technical solution can include a first controller and a second controller. The first controller can be a chip to perform self-test (alternatively, the first controller can be connected to, or coupled with a chip to perform self-test). The first controller may otherwise be designed, configured and operational to use a latching relay. However, in electrical communication with suitable circuitry, the first controller can be adapted for use with an electrically held relay. The first controller can process signals from a phase (e.g., hot or ungrounded) and neutral (e.g., grounded) conductor of a circuit. The first controller can determine the difference between these signals to determine, detect or otherwise identify a ground fault ("GF") or ground neutral ("GN") condition, and generate an output pulse signal. The first controller can periodically initialize a self-test using a self-test circuitry to inject a simulated ground fault. If the first controller does not detect the simulated ground fault, then the first controller can provide an indication or alert, such as via a blinking light emitting diode ("LED"), that provides a warning that the self-test was a failure. If, after a predetermined number of repeated attempts to simulate a ground fault ("GF"), the first controller still does not detect the simulated ground fault, the first controller can generate and output a pulse or other signal to deny power to a load. Thus, the first controller can deny power responsive to determining the self-test was a failure. After the denial of power, a user can attempt to reset the device by initiating a manual test via a button or other input operationally coupled to the first controller. It should be noted that such a manual test can also be initiated by a user at any time independently of the self-test.

To operate an electrically held relay to maintain an appropriate state of the GFCI, the first controller can interface with (e.g., interact with, communicate with, connect with, or otherwise utilize) a second controller. The second controller can monitor an output from the first controller that indicates the result of the self-test. In some cases, the second controller can receive the output of the self-test via a filtering circuit. The second controller can operate a relay through one or more transistors, in electrical communication with a solenoid which, in turn, is in electrical communication with the relay. The relay maintains the appropriate state of the GFCI. For example, a plurality of transistors can be connected in series so that the relay is kept on if both transistors are operating correctly. If one of the transistors fails in an open state, then the relay remains off independent of the signal from the second controller. If one of the transistors were to fail in a closed state (e.g., a short), then the device can operate correctly using another transistor in series with the failed transistor.

The second controller can monitor (i.e., check or otherwise identify) the position of a user operated manual button coupled to, connected to otherwise interfacing with the second controller (e.g., an input of the controller being in electrical communication with a set of contacts that are in turn mechanically engaged by a button). The second controller can be operatively coupled to a single manual button that is configured to initiate both a reset and test operation, or the second controller can be operatively coupled to two separate buttons, one of which is a reset button and the other of which is a test button.

When the one or more buttons are activated, the second controller can transmit (i.e., send, provide, or otherwise communicate) a signal to the first controller to initiate a manual test. The first controller can conduct the test to determine if the first controller detects a simulated fault signal from the self-test circuitry. Upon determining the test was successful (e.g., the simulated fault is detected), the first controller can generate an output signal or pulse that indicates the test was successful. The first controller can output the signal via a pin of the first controller, such as a silicon controller rectifier ("SCR") pin.

The second controller can detect the pulse, which is output by the first controller responsive to the first controller detecting the test was successful. When the second controller detects this pulse, the second controller can control the relay through the one or more transistors connected to the second controller. If the relay was in the on state, then the second controller can turn off the relay. If the relay was in the off state, then the second controller can turn the relay on. Thus, the relay can be turned on only if both the first controller and the second controller are functioning correctly. If the first controller was unable to or did not detect a fault via the self-test, then the second controller can turn off the relay or keep the relay in the off state, thereby denying power to the load as the device may be malfunctioning.

A power supply circuit can provide power to both the first controller and the second controller. In the event the power supply circuit is malfunctioning, then at least one of the first controller and the second controller may not receive proper power, which can cause the relay to be turned off automatically. Thus, the device can be turned on only after successful self-test by the first controller and proper operation of the power supply circuit (e.g., providing a reset lockout function). A reset lockout function can be referred to as a denial of power to the electronic device in case of circuitry malfunctioning.

In some cases, the device can be configured with an automatic reset device. The automatic reset device refers to a device that automatically turns on the relay after the device is connected to power. The device can reset after a successful self-test by the first controller.

After the device is connected to power, the device can automatically initiate a self-test. For example, the second controller can provide signal to the first controller to cause the first controller to initiate the self-test. The second controller can provide the signal responsive to receiving a signal indicative of self-test initiation. The first controller can perform the self-test. If the self-test performed by the first controller was successful, the first controller can generate and output a signal or pulse. The second controller can receive the signal indicating a successful test, and turn on the relay accordingly. If the first controller does not generate and provide the pulse within a predefined time window, then the second controller can keep the relay off. Thus, the second controller can prevent usage of a device that is malfunctioning.

Referring now to FIGS. 1A-B, example event and state flows for automatic and manual-reset circuit interrupter devices are shown. In brief overview, FIG. 1A illustrates a flow diagram for automatic-reset circuit interrupter device 102. FIG. 1B illustrates a flow diagram for a manual-reset circuit interrupter device 114. The flow charts can include multiple events and relay states corresponding to each event. The devices 102 and 114 can perform the events for self-testing ground fault. The devices 102 and 114 can include one or more component of apparatus 200 depicted in FIG. 2. The devices 102 and 114 can turn on the relay or keep the relay off in response to the self-test result. Relay on can refer to a state of the relaying being on, which can result in power being delivered to a load. The relay may be referred to as a latching relay.

Referring to FIG. 1A, and in further detail, the automatic-reset circuit interrupter device 102 can perform events 104, 106, 108, 110, and 112. The events can optionally be performed sequentially and consecutively. At event 104, power is initially applied to the circuit interrupter device 102. For example, the circuit interrupter device 102 can be plugged into a power outlet or power source. When power is initially applied to the circuit interrupter device 102, the state of the relay is OFF. When the relay is in the OFF state, the circuit interrupter device 102 denies power to a load connected to the circuit interrupter device 102. At event 106, the circuit interrupter device 102 automatically initiates a self-test. The circuit interrupter device 102 automatically initiates a self-test responsive to power being applied to the circuit interrupter device 102. The state of the circuit interrupter device 102 remains OFF when the circuit interrupter device 102 automatically initiates the self-test. At event 108, the circuit interrupter device 102 performs ground fault self-testing in response to the automatic initiation of the self-test at event 106. The state of the circuit interrupter device 102 remains OFF while the circuit interrupter device 102 is performing the self-test.

At decision block 110, the circuit interrupter device 102 determines whether the result of the self-test is a success or failure. If the self-test result is a failure, the state of the circuit interrupter device 102 remains OFF. Thus, the state of the circuit interrupter device 102 remains off from event 104 when power is initially applied to circuit interrupter device 102, and through the detection of a failed self-test at 110. After detecting the self-test failure, the circuit interrupter device 102 can automatically attempt to perform another self-test (or continuously perform self-tests for a duration of time), or determine to end the self-test and remain in the OFF state.

If the circuit interrupter device 102 determines, at decision block 110, that the self-test is a success, then the circuit interrupter device 102 turns on the relay at event 112 and provides power to the load. The circuit interrupter device 102 can change the state of the relay from OFF to ON upon detecting a successful self-test. The circuit interrupter device 102 remains in an OFF state from the initial power on, through an automatic self-test, and until the detection of a successful self-test at event 112, at which point the state of the relay changes to ON.

Referring to FIG. 1B, power is initially applied to a manual-reset circuit interrupter device 114 at event 116. The manual-reset circuit interrupter device 114 does not automatically begin a self-test at event 118 upon power being applied. Instead, the manual-reset circuit interrupter device 114 stays in an OFF state and waits until a user initiates a manual test. At event 118, manual-reset circuit interrupter device 114 can detect that the user has initiated a manual test (e.g., a user pressing a button on the manual-reset circuit interrupter device 114). At event 120, the manual-reset circuit interrupter device 114 performs a self-test.

At decision block 122, the manual-reset circuit interrupter device 114 determines whether the result of the self-test is a success or failure. If the self-test result is a failure, the state of the manual-reset circuit interrupter device 114 remains OFF. Thus, the state of the manual-reset circuit interrupter device 114 remains off from event 116 when power is initially applied to manual-reset circuit interrupter device 114, and through the detection of a failed self-test at 122. After detecting the self-test failure, the manual-reset circuit interrupter device 114 ends the self-test and remains in the OFF state.

If the manual-reset circuit interrupter device 114 determines, at decision block 122, that the self-test is a success, then the manual-reset circuit interrupter device 114 turns on the relay at event 124 and provides power to the load. The manual-reset circuit interrupter device 114 can change the state of the relay from OFF to ON upon detecting a successful self-test. The manual-reset circuit interrupter device 114 remains in an OFF state from the initial power on, through a user-initiated self-test, and until the detection of a successful self-test at event 124, at which point the state of the relay changes to ON.

Referring now to FIG. 2, a block diagram of an apparatus 200 that includes ground fault and/or self-testing in accordance with an aspect is shown. The apparatus 200 may be any electrical system (e.g., a wiring or lighting, system). The apparatus 200 may be required (e.g., by regulation or for compliance with a technical standard) to implement automatic (e.g., periodic) self-testing for ground faults without human intervention, and may be required (e.g., by regulation or for compliance with a technical standard) to interrupt power to a load of the apparatus 200 (or connected to the apparatus 200) upon a failure of such a test. In brief overview, the apparatus 200 can include a first controller 202 and a second controller 206. The first controller 202 can include one or more pins 202a, 202b, 202c, 202d, and 202e that can receive input signals or provide output signals. The apparatus 200 can include a visual indicator 210 in electrical communication with the first controller 202 via pin 202e. The apparatus 200 can include a second controller 206 that includes one or more pins 206a, 206b, 206c, and 206d that can receive input signals or provide output signals. The first controller 202 and the second controller 206 are in electrical communication with each other. The apparatus 200 can include a power supply 212 that provides power to the first controller 202 and the second controller 206. The power supply 211 can receive power from the power source 216. The apparatus 200 can include a relay 208, such as an electrically-held relay. The second controller 206 can provide a signal to the relay 208. The apparatus 200 can be in electrical communication with a power source 216 that provides power to the relay 208, and the relay 208 can provide power to a load 218. For example, the apparatus 200 can be plugged into an electrical receptacle, the electrical receptance being connected, in turn, to a power source 216. The apparatus 200 can include fault simulation circuitry 214 connected to the first controller 202. The apparatus 200 can include a button 220 that can cause a signal to be sent to the second controller 206. The apparatus 200 can include a filtering circuit 204 that transmits a signal between the first controller 202 and the second controller 206 via pins 202d and 206b. The apparatus 200 can be configured to perform a ground fault self-test, and to manage a state of the relay 208 in an improved manner following a reset of the apparatus 200 (e.g., following an interruption of power supplied by a power source 216).

Still referring to FIG. 2, and in further detail, the first controller 202 can be designed, constructed and operational to initialize a self-test and output a self-test result signal based on whether the self-test was successful. The first controller 202 can include one or more processing chips configured to perform a ground fault self-test on the fault simulation circuitry 214. The first controller 202 can interface with to one or more components or circuit elements of apparatus 200, including, for example, the second controller 206, filtering circuit 204, visual indicator 210, fault simulation circuitry 214, or the power supply 212. The first controller 202 can include one or more pins for electrical connection with other components of the apparatus 200. As used herein, the term "pin", although singular, can refer to an individual pin or a plurality of pins. The first controller 202 can be a controller that would otherwise be configured to control a latching relay. The apparatus 200 can use the first controller 202 in conjunction with the second controller 206 to control an electrically-held relay such as the relay 208.

The first controller 202 can receive a signal via the pin 202a to initiate a self-test. The pin 202a can be configured to receive such a signal either periodically (e.g., from a component or circuit that periodically outputs a signal to implement the self-test), receive such a signal responsive to a manually input command to implement a self-test, or receive such a signal upon powering on of the apparatus 200. For example, the first controller 202 may receive the signal to implement the self-test from the second controller 206 (e.g., an output signal from the pin 206a of the second controller 206). The signal may include a high value, low value, series of values, pattern, or other type of command, instruction, or indication to initiate a self-test. In some aspects, the pin 202a can be a push-to-test ("PTT") pin. In some cases, the first controller 202 can automatically determine to initialize the self-test responsive to the first controller 202 powering on or receiving power from the power supply 212. In some cases, the first controller 202 can initialize the self-test responsive to receiving a manual test signal via the PTT pin.

The pin 202b can output one or more signals to implement a self-test. The pin 202b can output the signal to fault simulation circuitry 214. The first controller 202 can use the pin 202b to output the signal to implement a self-test responsive to receiving, via the pin 202a, a signal to implement a self-test. The pin 202b can output a signal that simulates a ground fault in the fault simulation circuitry 214. The pin 202b can be a ground fault test ("GFT") pin that is in electrical communication with the fault simulation circuitry 214. Thus, the first controller can initialize a self-test of the system.

The first controller 202 can initialize the self-test of the system based on a time interval, responsive to a signal or command from the second controller 206, or responsive to a manual indication to initiate a self-test. For example, the first controller 202 can include a counter or timer configured for a time interval or time period. The counter can include a countdown timer or other type of timer. The first controller 202, responsive to the countdown timer expiring, can generate the signal to initiate the self-test and output the signal to the self-test circuitry.

The fault simulation circuitry 214 can be designed, constructed, and configured to simulate a ground-fault. The fault simulation circuitry 214 can include any circuitry elements, components, digital or analog components, or modules configured to simulate a ground-fault signal or facilitate a ground-fault test. The fault simulation circuitry 214 can communicate with the first controller 202. The fault simulation circuitry 214 can include any circuitry of the apparatus 200. The fault simulation circuitry 214 can include circuitry (e.g., differential and/or ground-neutral ("GN") cores for ground fault GF and GN condition detection) for simulating a ground fault. The fault simulation circuitry 214 may be required (e.g., by regulation or for compliance with a technical standard) to perform automatic (e.g., periodic) self-testing for ground faults without human intervention. The fault simulation circuitry 214 can include one or more diodes, resistors, or transistors that are connected to create a circuit configured to simulate a ground fault. The fault simulation circuitry 214 can provide a signal indicative of the simulated ground fault with the first controller 202 via the pin 202c.

For example, the fault simulation circuitry 214 can receive a signal or a command from the first controller 202 via the pin 202b to conduct a ground fault self-test. In response to receiving the signal from the first controller 202 to conduct the ground fault self-test, the fault simulation circuitry 214 can simulate a ground fault and provide a signal indicative of the simulated ground fault as input to the first controller 202 via the pin 202c. The fault simulation circuitry 214 can simulate a ground fault by generating and outputting a signal having a characteristic of electricity that represents a ground fault. The fault simulation circuitry 214 can simulate a ground fault by generating and outputting a signal with a current that is greater than zero or greater than a threshold that indicates a ground fault. The fault simulation circuitry 214 can generate and output a signal for providing an indication of the simulated ground fault to the first controller 202 that is greater than the threshold. The threshold can be any amount of current, including, for example, 3 milliamps, 4 milliamps, 5 milliamps, 6 milliamps, 7 milliamps, 8 milliamps, or more. For example, the fault simulation circuitry 214 can generate and output a signal that is greater than 4 milliamps.

The first controller 202 can include, or be coupled with, a differential sensor that receives this signal from the fault simulation circuitry 214 via the pin 202c and detects a simulated ground fault. The pin 202c can be connected to the fault simulation circuitry 214. The pin 202c can receive one or more signals from the fault simulation circuitry 214. The signals may constitute at least part of a result of the self-test. The signals may include signals from a differential core for ground fault (GF) condition detection.

The first controller 202 can receive or detect the simulated ground fault signal (e.g., an output signal greater than 4 milliamps) from the fault simulation circuitry 214 or differential transformer thereof. The first controller 202 can utilize one or more circuitry elements or differential sensors to analyze, process or otherwise compare the signal with a threshold to detect a ground fault. The first controller 202 can include comparator circuitry, a processor or other digital logic to detect a ground fault.

The first controller 202 can detect the simulated ground fault within a time interval of initiating the self-test. The first controller 202 can initiate the self-test via a signal output from the pin 202b at a first time. The first controller 202 can then receive the simulated ground-fault signal via the pin 202c at a second timestamp. The first controller 202 can detect the ground fault at a third timestamp responsive to receiving the simulated ground-fault signal. The first controller 202 can determine whether the self-test was successful or unsuccessful (e.g., a failure) based on whether the first controller 202 detects the ground fault based on the simulated ground fault signal. In an aspect, the first controller 202 can determine whether the self-test was successful or unsuccessful based on whether the first controller 202 detected the ground fault within a predetermined time interval. The predetermined time interval can be 2 seconds, 1 second, 0.5 second, 0.4 second, 0.3 second or other amount of time. The first controller 202 can determine that the time difference between the first timestamp (e.g., corresponding to when the first controller 202 initiated the self-test) and the third stamp (e.g., corresponding to when the first controller 202 detected the ground fault) is less than the predetermined time interval. If the time difference is less than the predetermined time interval, the first controller 202 can determine the self-test was successful, and output a signal via pin 202d that indicates a successful self-test. If, however, the first controller 202 does not detect a ground fault within the predetermined time interval, the first controller 202 does not generate and output any signal via the pin 202d during the predetermined time.

The first controller 202 can determine to repeat the self-test a predetermined number of times or run the self-test for a predetermined duration. For example, the first controller 202 can repeat the self-test 2 times, 3 times, 4 times, 5 times, 10 times, 20 times, 30 times, 40 times, 50 times, or other number of times before determining that the self-test was a failure. The first controller 202 can run the self-test for a certain duration of time (e.g., 1 second, 2 seconds, 3 seconds, 5 seconds, 10 seconds, 15 seconds, 20 seconds, or another duration), and if the apparatus 200 does not detect a successful self-test during the duration, the apparatus 200 can determine that the self-test was a failure. Thus, the first controller 202 can initiate or execute the self-test multiple times during for a duration of time, and determine whether the self-test was successful based on whether the first controller 202 detects a ground-fault condition within a predetermined time interval.

The first controller 202 can provide a signal indicative of the result of the self-test to an indicator. The first controller 202 can provide an indication via the visual indicator 210 or an audio indicator via the pin 202e of the apparatus 200. The visual indicator 210 can include a light emitting diode (LED). The visual indicator 210 can include, for example, a green LED or a red LED. The visual indicator 210 can indicate a result of a self-test, or indicate whether power to the load 218 is on or off. The second controller can provide audio or visual indications, communicate failure over a power line, or communicate failure wirelessly, such as over radio frequency ("RF") using various protocols such as WiFi, Bluetooth Low Energy, a proprietary RF protocol.

The first controller 202 can use the pin 202e to output the signal to cause the visual indicator 210 to indicate a result of the self-test. The first controller 202 can generate the signal to cause the visual indicator 210 to provide a visual indication with certain characteristics, such as a color (e.g., red, green, white, blue, etc.), a flashing pattern, or an intensity of the light output.

The first controller 202 can output a signal that indicates the result of the self-test to the second controller 206 via the pin 202d. In some cases, the pin 202d can output the signal to the second controller 206 via a filtering circuit 204. The signal can be a demand for denial of power to the load 218. The pin 202d can be a silicon controller rectifier ("SCR") pin.

The filtering circuit 204 can be designed, constructed, and configured to filter a signal. The filtering circuitry 204 can include any circuitry, components, elements, digital or analog components, or modules to filter a signal. For example, the filtering circuitry 204 can include one or more resistors and capacitors configured and connected to provide a low pass filter, high pass filter, or bandpass filter. The filtering circuit 204 can include one or more diodes. The filtering circuit 204 can be configured to modify the signal output via the pin 202d to the second controller 206 such that the signal is readily handled by the second controller 206. This can be useful, for example, when implementing the first controller 202 otherwise configured to control a latching relay, such that the first controller 202 need not be updated or modified to provide a signal appropriate for the second controller 206.

The second controller 206 can be designed, constructed, and operational to control the relay 208 that selectively establishes electrical communication between the load 218 and the power supply 216. The second controller 206 can include circuitry, digital or analog components, elements, or modules. The second controller 206 can interface with one or more component or circuit element of apparatus 200, including, for example, the first controller 202, filtering circuit 204, relay 208, power supply 212, or button 220. The second controller 206 can use one or more pins to control the first controller 202 to perform a ground fault self-test using the fault simulation circuitry 214. The second controller 206 can use one or more pins to control the relay 208.

The second controller 206 can generate and output a signal to implement (i.e., initiate, initialize, or otherwise cause) a ground-fault self-test to be performed by the first controller 202. The second controller 206 can output the signal via the pin 206a of the second controller 206. The second controller 206 can provide the signal to the pin 202a of the first controller 202. The second controller 206 can be configured to generate a signal that is compatible with the first controller 202 and input via the pin 202a.

The second controller 206 can determine a ground-fault based on one or more conditions, events, triggers, time intervals, or commands. For example, the second controller 206 can receive a manual indication (e.g., via button 220) to implement the ground-fault self-test. The second controller 206 can determine a ground-fault responsive to detecting a power-on condition. The second controller 206 can determine a ground-fault based on a time interval (e.g., every minute, 2 minutes, 5 minutes, 10 minutes, 30 minutes, hourly, 2 hours, 6 hours, 12 hours, 24 hours, 48 hours, weekly, or other time interval). The second controller 206 can determine a ground-fault responsive to detecting an event, such as a power being supplied to the load 218, or disconnection and re-connection of power to the load 218, powering on of the apparatus 200 or any component thereof, change in temperature, humidity, contact with water, motion sensor information, proximity detection, or other event or condition.

For example, the second controller 206 can output the signal to implement a self-test responsive to power being supplied by the power supply 212 (e.g., following an interruption of the power from the power source 216, such as following a power reset). For example, the second controller 206 can power-on responsive to the apparatus 200 being plugged into the power source 216 (which, in turn, energizes the power supply 212). As part of a power-on or boot-up procedure or process, the second controller 206 can determine to initiate a ground-fault self-test. The second controller 206, responsive to the determination to initiate the ground-fault self-test, can generate a signal. The signal can include an initialization signal, command, instruction, or other indication that causes the first controller 202 to initiate, execute, perform, or otherwise implement the ground-fault self-test. For example, the second controller 206 can generate a signal with an instruction to initiate a ground-fault self-test and output the signal to the first controller 202. The first controller 202, upon receiving the signal output from the second controller 206, can determine to initiate the ground-fault self-test and generate another signal for transmission to the fault simulation circuitry 214 to cause the fault simulation circuitry 214 to simulate a ground-fault.

The second controller 206 can output the signal to implement a self-test responsive to receiving a signal from the button 220 via the pin 206d. For example, a user can manually implement the self-test by pushing (i.e., actuating, switching, or otherwise interacting with) the button 220. The pin 206d can receive a signal from the button 220 (e.g., via electrical contacts engaged thereby) after the apparatus 200 powers on. The second controller 206 can monitor a state of the button 220 (e.g., may determine when the button 220 is depressed). Responsive to receiving a signal from the button 220 (e.g., a user pushing the button when the apparatus 200 powers on), the second controller 206 can output the signal to initiate a self-test to the first controller 202. The button can engage electrical contacts which are, in turn, connected to the power supply 212. Actuating the button 220 can cause a signal to be input to the pin 206d of the second controller 206. The signal can have a voltage that is based on electricity provided by the power supply 212 to the electrical contacts engaged by the button 220. For example, actuating the button 220 can cause the electrical contacts to close a circuit between the power supply 212 and the pin 206d, which can provide a current or signal to the second controller 206 via the pin 206d. The second controller 206 can receive this signal, and interpret this signal as an instruction to implement a ground fault self-test.

In some cases, the button 220 can be included/incorporated in the power supply 212. In some cases, the button 220 can be a single reset-and-test button. In some cases, the apparatus 200 can include multiple buttons 220, such as a separate reset button and a separate test button to provide test and reset functionality. For example, in the case in which the button 220 is a single reset-and-test button, pressing the button 220 when the apparatus 200 is in a tripped state (e.g., the relay 208 is in an OFF state and no power is being delivered to the load 218) causes the apparatus 200 to start a self-test. If the self-test was successful, the second controller 206 closes the relay 208 contact, resetting the apparatus 200 and delivering power to the load 218. When the apparatus 200 is in a reset state, pressing the single reset-and-test button 220 again initiates a self-test. If this self-test is successful, the second controller 206 opens relay 208, switching the apparatus 200 into a tripped state. If the self-test is unsuccessful, the second controller forces the relay 208 open and outputs an indication that the apparatus 200 is malfunctioning. The apparatus 200 can be later reset when the self-test is successful.

The pin 206b can receive a signal from the first controller 202 (e.g., via the pin 202d, or via the filtering circuit 204). The signal from the first controller 202 can be a signal indicating a result of the self-test. The signal from the first controller 202 can be a signal demanding a denial of power to the load 218. The signal from the first controller 202 can indicate whether the self-test was successful or unsuccessful. The second controller 206 can receive a signal and determine or identify whether the self-test was successful or unsuccessful. The result of the self-test is indicated by outputting a pulse, or by the absence of any such output pulse. For example, an output signal or pulse can indicate a successful self-test, whereas the absence of such an output signal or pulse indicates an unsuccessful self-test. The signal can include a constant signal, or pulse train signal. For example, if the signal has a constant high voltage value, then the second controller 206 can determine that the self-test was a success. If the signal has a constant low voltage value, then the second controller 206 can determine that the self-test was a failure. A high voltage can refer to a voltage above a threshold, such as a 5 volt signal, 10 volt signal, 12 volt signal, or other voltage level the power supply 212 is configured to provide. A low voltage signal can refer to a voltage below a threshold, such as 0 volts, 1 volt, or other 2 volts, for example. The signal can include binary values, a pattern.

The second controller 206 can determine how to control the relay 208 based on the signal received at the pin 206b indicating the result of the self-test. The second controller 206 can determine the result of the self-test based on the signal. The second controller 206 can use one or more logic devices, circuitry, rules, or programs to determine how to control the relay 208. The second controller 206 can control (i.e., adjust, modify, maintain, or otherwise manage) the relay 208 responsive to the result of the self-test. The second controller 206 can output a signal to the relay 208 (e.g., to one or more transistors in electrical communication with the relay 208) via the pin 206c. The second controller 206 can output the signal to the relay 208 responsive to receiving the signal from the first controller 202, which indicates a result of the self-test, or a demand to deny power to the load 218.

If the second controller 206 determines that the self-test was a success, then the second controller 206 can turn on the relay 208. Turning on the relay 208 can refer to causing the relay 208 to enter an ON state in which power from the power source 216 is provided to the load 218. If the second controller 206 determines that the self-test was a failure, then the second controller 206 can turn off the relay 208. Turning off the relay 208 can refer to causing the relay 208 to enter an OFF state in which power from the power source 216 is denied or otherwise prevented from reaching the load 218.

The second controller 206 can monitor an output from the first controller 202 that indicates the result of the self-test. The second controller 206 can operate a solenoid in electrical communication with the relay 208 through one or more transistors to maintain the appropriate state of the GFCI. For example, the transistors that control the relay 208 can be connected in series so that the relay 208 is kept on if both transistors are operating correctly. If one of the transistors is broken, then the relay 208 remains off independent of controls from the second controller 206. If one of the transistors were to short, then the device can operate correctly using another transistor.

The second controller 206 can detect the pulse, which was output by the first controller 202 responsive to the first controller 202 detecting the test was successful. When the second controller 202 detects this pulse, the second controller 206 can control the relay 208 through the one or more transistors connected to the second controller 206. If the relay 208 was in the on state, then the second controller 206 can turn off the relay 208. If the relay 208 was in the off state, then the second controller 206 can turn the relay 208 on. Thus, the relay 208 can be turned on only if both the first controller 202 and the second controller 206 are functioning correctly. If the first controller 202 was unable to or did not detect a fault via the self-test, then the second controller 206 can turn off the relay 208 or keep the relay 208 in the off state, thereby denying power to the load 218 as the apparatus 200 may be malfunctioning or not properly functioning. If the self-test by the first controller 202 was a success, then the second controller 206 can turn on the relay 208 or keep the relay 208 in the on state.

In aspects, in a manual reset GFCI system, the second controller 206 can receive a signal from the first controller 202 indicating that the self-test was successful. The second controller 206 can control the relay 208 to enter an on state to provide power to the load 218. After restoration of power following an apparatus 200 power interruption to the apparatus 200, the manual reset GFCI system may automatically default the relay 208 to an off state. Accordingly, after a system reset, the second controller 206, upon powering on, can implement a self-test but will only do so in response to manual intervention by a user. The implementation of the self-test can cause the first controller 202 to conduct a self-test and provide the result to the second controller 206. If the self-test was successful, the second controller 206 can switch the relay 208 from the off state to the on state.

In aspects, in an automatic reset GFCI system, the second controller 206 can receive a signal from the first controller 202 indicating that the self-test was unsuccessful. The second controller 206 can control the relay 208 to enter an off state to deny power to the load 218. After apparatus 200 restoration of power following a power interruption, the automatic reset GFCI system may automatically conduct a self-test and, if successful, transition the relay 208 to an on state. If the self-test was a failure, the second controller 206 can cause the relay 208 to remain in the off state. The relay 208 can be controlled by one or more transistors which are, in turn, controlled by the second controller 206 (e.g., via the pin 206c).

The second controller 206 can automatically turn the relay 208 on after a power reset or powering on. The second controller 206 can automatically turn the relay 208 off after a power reset, or keep the relay 208 off until there has been a successful self-test of the GFCI. Thus, the electrically-held relay can be configured to be off when the apparatus 200 powers on, and the second controller 206 can turn on the relay 208 responsive to, and in accordance with, the self-test result signal from the first controller 202 indicating that the self-test signal was successful.

The apparatus 200 can include a power supply 212. The power supply 212 can supply power that is appropriate or configured for the first controller 202 and the second controller 206, and any components used by the controllers 202 and 206, to function. The power supply 216 can supply power to the load 218. For example, the power supply 212 can include one or more components or circuitry that provide power to the first controller 202 and the second controller 206 with characteristics of electricity (e.g., voltage, current, frequency, direct current, alternating current, etc.) that are compatible with the first controller 202 and the second controller 206.

The power supply 212 provides power to one or more components of the apparatus 200. The power supply 212 can supply power to the first controller 202 or the second controller 206. The second controller 206 can use the pin 206a to output a signal to the first controller 202 to implement a self-test when power from the power supply 212 is provided (e.g., when the power source 216 is turned on, or following a reset of the apparatus 200).

The load 218 can refer to any type of an electronic device, system or component that can use electricity to perform a task or function. The load 218 can include, for example, a lighting device, appliance, power tool, charger, computing device, electric motor, etc.

Figure 3:
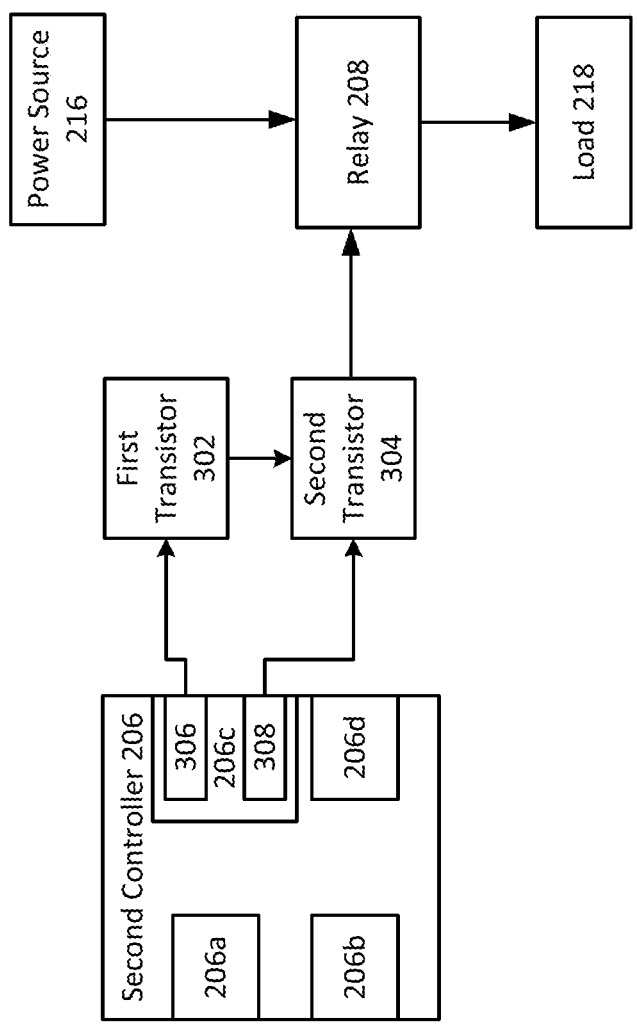
FIG. 3 is a block diagram for a relay of a system for ground fault self-testing, in accordance with aspects described herein.

FIG. 3 is a block diagram showing the second controller 206 and the relay 208 of the apparatus 200 for ground fault self-testing, in accordance with aspects described herein. The relay 208 can be connected to the power source 216. The relay 208 can deliver power to the load 218. The relay 208 can be in electrical communication with one or more transistors. The one or more transistors can include a first transistor 302 and a second transistor 304. The first transistor 302 can be connected to the second transistor 304 in series. The one or more transistors can turn the relay 208 on or off in order to deliver or block delivery of power to the load 218.

The relay 208 can be connected to the second controller 206 via the pin 206c. The pin 206c can include a first pin 306 and a second pin 308. The first pin 306 can connect to the first transistor 302, and the second pin 308 can connect to the second transistor 304. Thus, the second controller 206 can individually control the state of the first transistor 302 and the second transistor 304 using via the pins 306 and 308. In some cases, one of the transistors 302 and 304 can function as a backup transistor. For example, the second transistor 304 can be referred to as a backup transistor, while the first transistor 302 can be the active transistor. The second controller 206 can control the state of the relay 208 by changing only the state of the active transistor (e.g., the first transistor 302), provided that the first transistor 302 is functioning properly. The second controller 206 can control the state of the relay 208 while the backup transistor (e.g., the second transistor 304) remained powered on. However, if the first transistor 302 breaks (e.g., it is shorted to be always on), the second controller 206 can still control the state of the relay 208 by controlling the state of the second transistor 304 via the pin 308.

Figure 4:
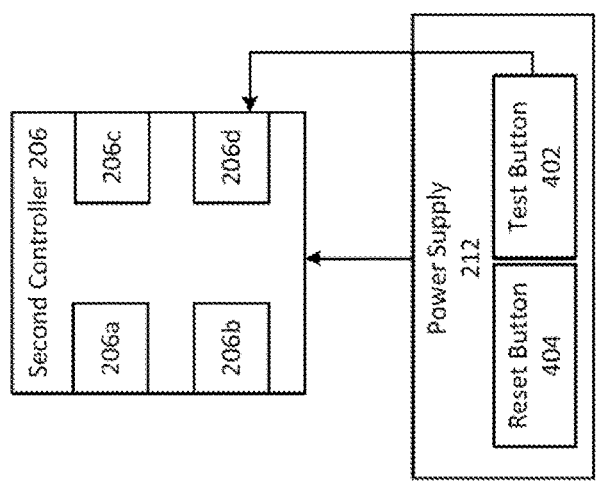
FIG. 4 is a block diagram for a system having separate reset and test buttons and that implements a system for ground fault self-testing, in accordance with aspects described herein.

FIG. 4 is a block diagram showing a system 400 for ground fault self-testing, which has separate reset and test buttons in accordance with aspects described herein. The system 400 can include one or more components, devices, elements, circuits, or modules of the apparatus 200 of FIG. 2. For example, the system 400 can include the second controller 206 with the pins 206a, 206b, 206c and 206d. The second controller 206 can receive power from the power supply 212. The power supply 212 can include a test button 402 and a reset button 404. The buttons 402 and 404 can include one or more component or functionality of the button 220 depicted in FIG. 2.

The test button 402 can, responsive to actuation or interaction, provide an indication to the second controller 206 to implement a ground fault test. The test button 402 can be connected to the pin 206d of the second controller 206. Actuation of the test button 402 can provide a signal to the second controller 206. The second controller 206 can receive the signal via pin the 206d. Responsive to the signal (e.g., a pulse), the second controller 206 can test a ground fault by sending a signal or pulse to the first controller 202.

Figure 5A:
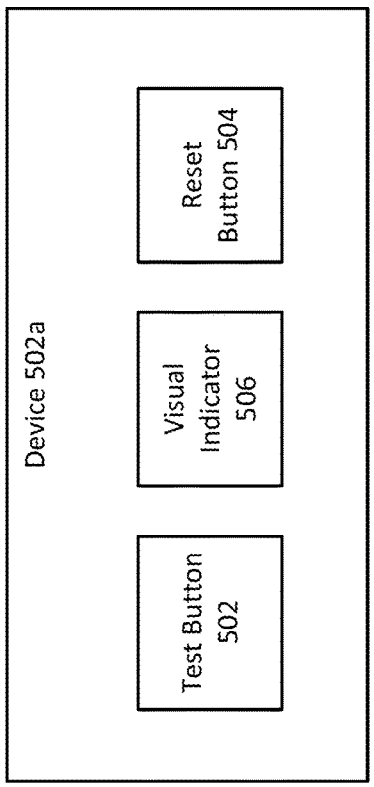
FIG. 5a is a block diagram for a device that implements a system for ground fault self-testing.

FIG. 5a is a block diagram of a device 502a for ground fault self-testing, in accordance with aspects described herein. The device 502a can include one or more component, circuitry or functionality depicted in FIGS. 2-4, including, for example, the apparatus 200, the system 400, the first controller 202, the second controller 206, or the relay 208. The device 502a can refer to a GFCI device. The device 502a can include a test button 502, a reset button 504, and a visual indicator 506. The visual indicator 506 can include one or more component or functionality of the visual indicator 210 depicted in FIG. 2. The device 502a can conduct a ground fault test responsive to actuation of test button 502 or reset button 504, or both. The device 502a can provide an indication, warning, alert, or other status information via the visual indicator 506. For example, the device 502a can display a green light to indicate that the self-test was successful or that the relay 208 is in an on state and delivering power to a load. The device 502a can display a red light to indicate that the self-test was unsuccessful. The device 502a can display a flashing or blinking light (e.g., red LED) if the first controller 202 does not detect a simulated ground fault during the self-test.

Figure 5B:
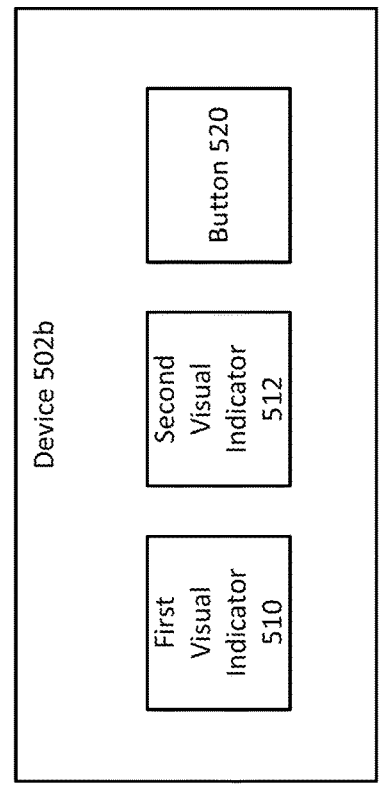
FIG. 5b is a block diagram for a device that implements a system for ground fault self-testing, in accordance with aspects described herein.

FIG. 5b is a block diagram showing a device 502b for ground fault self-testing, in accordance with aspects described herein. The device 502b can include one or more component, circuitry or functionality depicted in FIGS. 2-4, including, for example, the apparatus 200, the system 400, the first controller 202, the second controller 206, or the relay 208. The device 502b can refer to a GFCI device. The device 502b can include a button 520, a first visual indicator 510, and a second visual indicator 512. The first and second visual indicators 510 and 512 can include one or more component or functionality of the visual indicator 210 depicted in FIG. 2. The device 502b can conduct a ground fault test responsive to actuation of the button 520, which can be a single reset-and-test button that can provide the functionality of both the test button 402 and the reset button 404 depicted in FIG. 4. The device 502b can provide an indication, warning, alert, or other status information via the visual indicators 510 and 512. For example, the device 502b can display a green light via the visual indicator 510 to indicate that the self-test was successful or that the relay 208 is in an on state and delivering power to a load. The device 502b can display a red light via the second visual indicator 512 to indicate that the self-test was unsuccessful. The device 502b can display a flashing or blinking light (e.g., red LED) via the first visual indicator 510 or the second visual indicator 512 if the first controller 202 does not detect a simulated ground fault during the self-test.

In some cases, the first visual indicator 510 can display the result of the ground fault test, and the second visual indicator 512 can display the status of the device 502b itself, such as a status of the relay 208, the first controller 202 or the second controller 206.

Figure 6B:
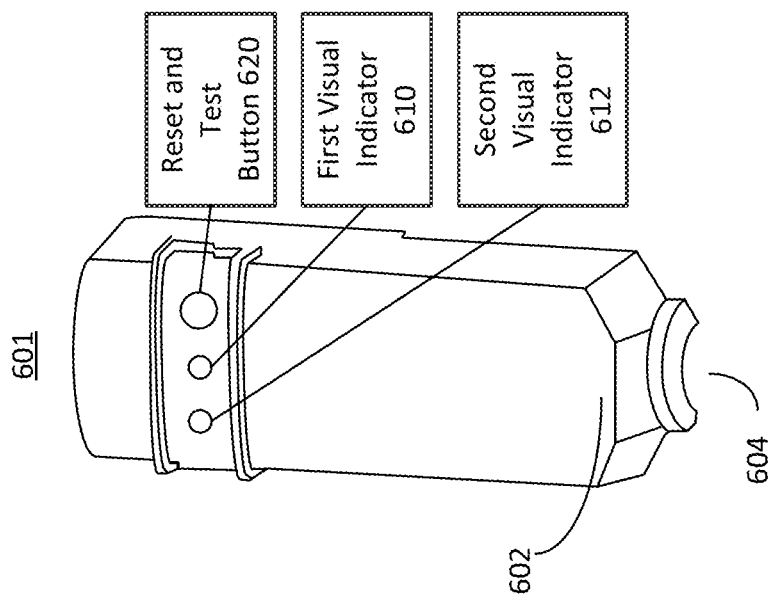
FIG. 6b is a depiction of an example device that implements a system for ground fault self-testing, in accordance with aspects described herein.
Figure 6A:
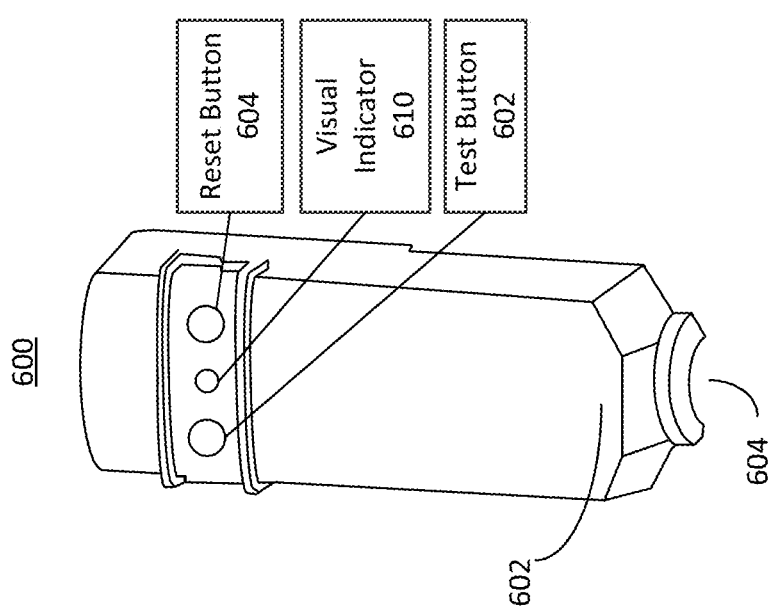
FIG. 6a is a depiction of a comparative example of a device that implements a system for ground fault self-testing.

FIG. 6a is a device 600 for ground fault self-testing, in accordance with aspects described herein. The device 600 can include one or more component, circuitry or functionality depicted in FIGS. 2-4 and 5a, including, for example, the apparatus 200, the system 400, the first controller 202, the second controller 206, or the relay 208. The device 600 can include a reset button 604 such as the reset button 404 of FIG. 4, a separate test button 602 such as the test button 404 of FIG. 4, and a visual indicator 610 such as the visual indicator 210 of FIG. 3. The device 600 can include an enclosure 602, such as a housing or a case, that encloses the circuitry and other components of the apparatus 200 or system 400. The enclosure 602 can be formed of any material. The enclosure 602 can be formed of a non-conductive material, such as plastic, rubber, or a combination thereof. The enclosure 602 can include an opening 604 through which a power cable or wire can extend externally from the enclosure 602 and connect to a power source 216.

FIG. 6b is a device 601 for ground fault self-testing, in accordance with aspects described herein. The device 601 can include one or more component, circuitry or functionality depicted in FIGS. 2-4 and 5b, including, for example, the apparatus 200, the system 400, the first controller 202, the second controller 206, or the relay 208. The device 601 can include a reset and test button 620 such as the reset and test button 220 of FIG. 2, a first visual indicator 610 such as the first visual indicator 510 of FIG. 5b, and a second visual indicator 612 such as the second visual indicator 512 of FIG. 5b. The first visual indicator 610 can be a green LED, and the second visual indicator 612 can be a red LED. The 601 can turn on one of the green LED or the red LED based on the status of the system, or result of the ground fault self-test. The device 601 can include an enclosure 602, such as a housing or a case, that encloses the circuitry and other components of the apparatus 200 or system 400. The enclosure 602 can be formed of any material. The enclosure 602 can be formed of a non-conductive material, such as plastic, rubber, or a combination thereof. The enclosure 602 can include an opening 604 through which a power cable or wire can extend externally from the enclosure 602 and connect to a power source 216.

FIG. 7 depicts a method for ground fault self-testing, in accordance with aspects described herein. The method 700 can be performed by one or more system, circuitry, component, or device depicted in FIGS. 2-6b, including, for example, the apparatus 200, the system 400, the first controller 202, the second controller 206, the self-test circuit 214, or the relay 208. In brief overview, a first controller can initialize a self-test at step 702. At step 704, the first controller can determine whether the self-test was successful. At step 706, the first controller can output, to a second controller, a self-test result signal based on whether the self-test was successful. At step 708, the second controller can receive the self-test result signal from the first controller. At step 710, the second controller can control a relay (e.g., an electrically-held relay that establishes electrical communication between a power source and a load based on the self-test result signal.

Still referring to FIG. 7, at step 702, the first controller can initialize the self-test responsive to an instruction, indication or command to initialize the self-test. The first controller can initialize the self-test based on a condition, event, trigger, or time interval. For example, the first controller can be configured to periodically initiate a self-test. The first controller can receive a signal from the second controller that request or instructs the first controller to initiate the self-test. The first controller can determine to initiate the self-test responsive to a condition, such as a reset signal or a test signal. The first controller can determine to initiate the self-test responsive to an event, such as powering on of the first controller or the second controller, or upon user intervention.

The first controller can initialize the self-test by generating a signal and outputting the signal to a self-test circuit. The first controller can generate a signal that instructs or causes the self-test circuit to simulate a ground fault. The first controller can cause the simulation of a ground fault. The self-test circuit can simulate the ground fault. Detection circuitry (e.g., a differential transformer) can provide a signal to the first controller indicative of the simulated fault.

At step 704, the first controller can determine whether the self-test was successful. The first controller can receive the signal indicative of simulated ground fault (e.g., simulated ground fault signal). The first controller can process the ground fault test. The first controller can compare the simulated ground fault signal from the self-test circuitry with a threshold signal or threshold value to determine whether there is a ground fault. If the first controller determines the simulated ground fault signal is greater than a threshold (e.g., 6 milliamps), then the first controller can detect a ground fault.

In some cases, the first controller can repeatedly instruct the self-test circuit to simulate a ground fault, for example until a predetermined duration expires or predetermined number of times. If the first controller does not detect the simulated ground fault, or does not detect the simulated ground fault within the predetermined duration, then the first controller can determine that the result ground fault self-test was unsuccessful or a failure.

At step 706, the first controller can output, to a second controller, a self-test result signal based on whether the self-test was successful. The first controller can output a signal via a pin of the first controller that indicates that the test was successful.

At step 708, the second controller can receive the self-test result signal from the first controller. The second controller can determine whether the result was a success or a failure. The second controller can receive the signal via a filter circuit that filters the signal such that the signal is compatible with the second controller.

At step 710, the second controller can control a relay that selectively establishes electrical communication between a power source and a load based on the self-test result signal. If the result was successful, the second controller can turn on the relay (or allow the relay to continue to be turned on) in order to deliver power from a power source to a load. If the result of the self-test was a failure, then the second controller can turn off the relay or keep the relay off to prevent or deny power from being delivered from the power source to the load.

In some cases, the relay can be turned off by default. The initial state of the relay can be off. The second controller can turn on the relay responsive to receiving an indication of a successful self-test. For example, when the system powers on, the relay can be kept off until the second controller receives an indication of a successful self-test.

Figure 8:
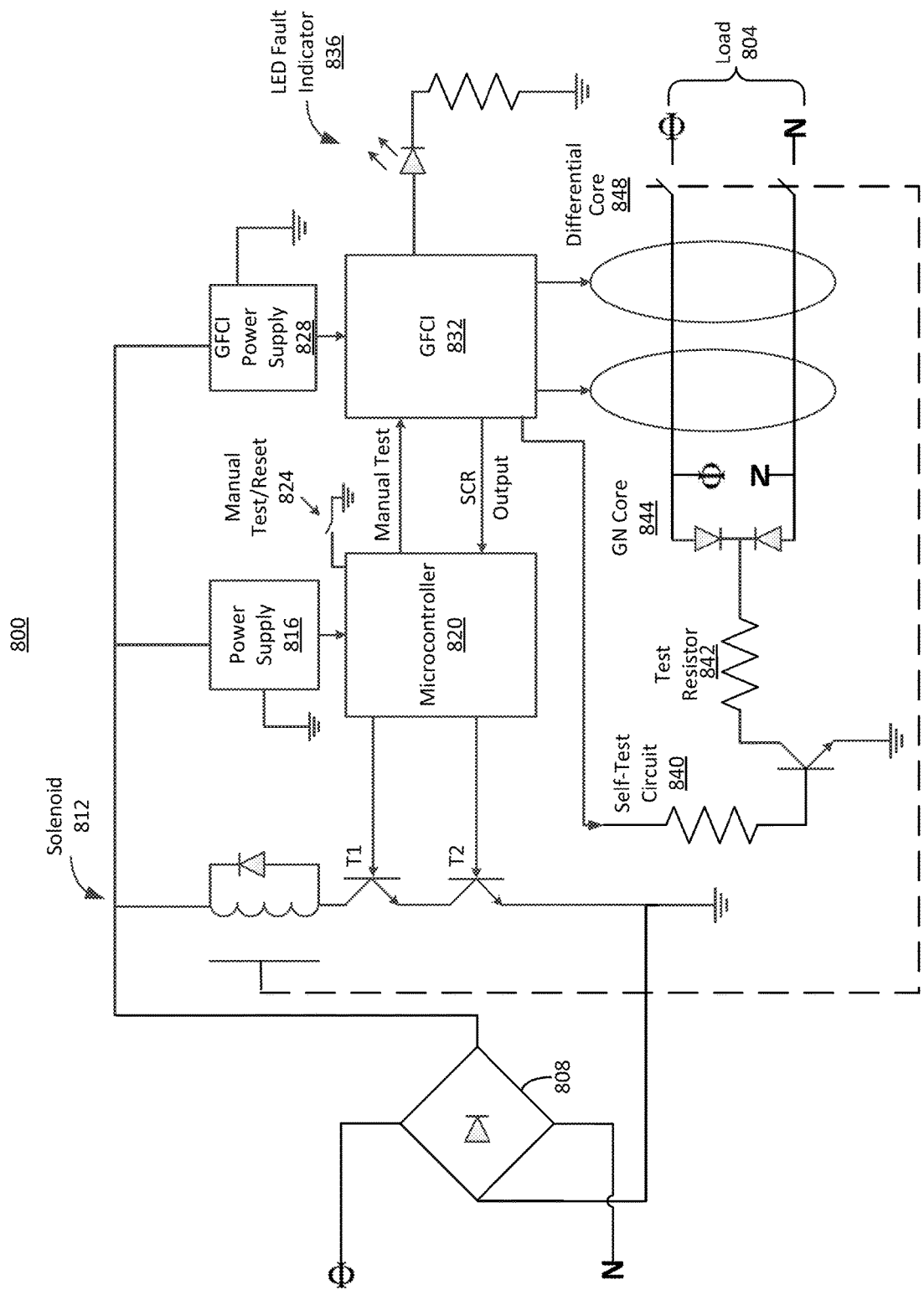
FIG. 8 is a schematic diagram for a circuitry for ground fault self-testing, in accordance with aspects described herein.

FIG. 8 depicts a schematic diagram of circuitry 800 for ground fault self-testing, in accordance with an aspect. The circuitry 800 can form or be included in the apparatus 200 or the device 600 or 601, and include components with one or more functions similar to components in at least FIGS. 2-6, for example. The circuitry 800 can include a load 804, a bridge rectifier 808, a solenoid 812, a power supply 816, a microcontroller 820, a manual test and reset button 824, a ground-fault circuit interrupter (GFCI) power supply 828, a GFCI circuit 832, an LED fault indicator 836, and a self-test circuit 840. The circuitry 800 can include an inductor, a resistor, an amplifier, a transistor, or any other electrical components. The electrical components can be in electrical communication with each other via one or more conductive traces on a printed circuit board (PCB), for example. In some implementations, the electrical components can intercommunicate with each other using wireless signal, such as via radio wave or Bluetooth.

The load 804 can include one or more devices connected or coupled to the circuitry 800. The load 804 can be reside in the same housing or reside in a different housing than the circuitry 800. The load 804 and circuitry 800 can be in electrical communication with each other via a hardwired cable (e.g., a wiring harness) or via an electrical plug and connector. The load 804 may be a resistive load, an inductive load, or a capacitive load. The load 804 can connect to one or more components of the circuitry 800. For example, the load 804 can include a circuitry independent from the circuitry 800. The circuitry 800 can include at least one switch, connected to at least one other component in the circuitry 800, configured to open or close to disconnect or connect to a power source. The switch of the load 804 can be configured by manual operation (e.g., operator manually turning the switch on and off) or automatic operation (e.g., responsive to a signal, periodic, threshold, or other conditions). In aspects, the load 804 can correspond to, or perform one or more similar functions similar to, the load 218 of FIG. 2.

The bridge rectifier 808 can electrically communicate with other components in the circuitry 800. For example, the rectifier 808 can connect to the solenoid 812, a neutral line, one or more transistors, a microcontroller 820, the power supply 816, and the GFCI power supply 828. The rectifier 808 may be a diode bridge rectifier, a full-wave rectifier, or other types of rectifier for AC power conversion. The rectifier 808 can include multiple diodes for configuring the polarity of an AC signal. In some implementations, the rectifier 808 can convert an AC input with both positive and negative polarities to output only positive polarity (e.g., a direct current (DC) output). In aspects, the rectifier 808 can convert the AC input with both polarities to output only negative polarity. The rectifier 808 can transmit signal in a single polarity to the solenoid 812, the power supply 816, and the GFCI power supply 828, for example.

In aspects, the rectified voltage can be measured by a voltage measurement circuit (not shown), which can be mounted on a panel version of the circuitry 800. The voltage measurement circuit can detect a magnitude of the rectified voltage. When the magnitude is less than or equal to a lower limit (e.g., about 65 V) or greater than or equal to an upper limit (e.g., 170 V), the power is removed from the circuitry 800, thereby preventing load damage during neutral loss at power source. The microcontroller 820 can control one or more light emitting diodes (LEDs) to indicate the power removal.

The solenoid 812 can connect to the rectifier 808, one or more transistors, the power supply 816, and the GFCI power supply 828. The solenoid 812 can be in electrical communication with the relay, as described in at least FIGS. 1-2. The relay can correspond to, or perform one or more functions similar to, the relay 208. The solenoid 812 can be operated by the microcontroller 820. The solenoid 812 may be connected in series with the one or more transistors to maintain appropriate state of the apparatus. For example, the one or more transistors that control the relay can be connected in series to determine the condition of at least one transistor. If all the transistors are operable, electrical signal will flow through the solenoid 812 and the transistors, keeping the relay powered on. However, if at least one of the transistors malfunction or is inoperable, the series connection from the solenoid 812 through the transistors will be open. As the connection is opened, electrical power may not flow through, powering off the relay in electrical communication with the solenoid 812. In aspects, the solenoid 812 can correspond to, or perform one or more functions similar to, the solenoid as described in at least FIG. 2.

The power supply 816 may perform similar functionalities as the GFCI power supply 828. The power supply 816 can be in electrical communication with the microcontroller 820. The power supply 816 can generate electrical power for operating the microcontroller 820. The power supply 816 can provide electrical power to the relay, thus establishing electrical communication between the power source and the load 804. In some cases, the power supply 828 may provide electrical power to the GFCI circuit 832, in addition to the microcontroller 820. In some implementations the power supply 816 can correspond to, or perform one or more similar functionalities to, the power source 216.

The microcontroller 820 can be in electrical communication with one or more transistors, the power supply 816, the manual test and reset button 824 (via respective electrical contacts engaged thereby), and the GFCI circuit 832. The transistors can be in series with the solenoid 812. The microcontroller 820 can connect to the GFCI circuit 832 via a silicon controller rectifier ("SCR") pin and a manual test pin (e.g., push-to-test ("PTT") pin). In some implementations, the SCR pin and the PTT pin can correspond to, or include similar features as, the pin 202*d* and the pin 202*a* of the first controller 202, respectively. The microcontroller 820 can send, via manual test pin, at least one signal to the GFCI circuit 832 to initiate a self-test. The microcontroller 820 can monitor an output from the GFCI circuit 832 via the SCR pin, which indicates a result of the self-test. The microcontroller 820 can operate the solenoid 812 by providing electrical signal to the transistors. In some implementations, the microcontroller 820 can correspond to, or perform one or more similar functionalities to, the second controller 206.

The manual test and reset button 824 can be in electrical communication (via electrical contacts engaged thereby) with the microcontroller 820 and the power supply 816. The button 824 can be manually triggered. For example, an operator can manually push the button 824. In a further example, the electrical state of the electrical contacts engaged by the button 824 may be changed in response to a timer or a countdown. The electrical contacts engaged by the button 824 can send electrical signal to initiate both test and reset operation of the microcontroller 820. In some cases, the button 824 can be a first button for initiating the test operation, and a second button for initiating the reset operation. In aspects, the button 824 can correspond to, or perform one or more similar functionalities to, the button 220.

The GFCI power supply 828 can be in electrical communication with the GFCI circuit 832. The GFCI power supply 828 can provide electrical power for operating the GFCI circuit 832. In some cases, the GFCI power supply 828 can provide electrical power to the microcontroller 820, in addition to the GFCI circuit 832. In aspects, the GFCI power supply 828 can correspond to, or perform one or more similar functionalities to, the power supply 212.

The GFCI circuit 832 can be in electrical communication with at least the self-test circuit 840, the GFCI power supply 828, the microcontroller 820, and the LED fault indicator 836. The GFCI circuit 832 can receive electrical power from the GFCI power supply 828. The GFCI circuit 832 can allow electrical communication to be established between a power source and the load 804 in response to detecting a ground fault. The GFCI circuit 832 can receive, from the microcontroller 820, a signal to initiate self-test via the self-test circuit 840. The initiation of the self-test tests the ability of the GFCI circuitry to respond to a ground fault. Subsequent to self-testing the circuit, the GFCI circuit 832 can transmit the result of the self-test to the microcontroller 820. In aspects, the GFCI circuit 832 can correspond to, or perform one or more similar functionalities to, the first controller 202.

The LED fault indicator 836 (e.g., indicator 836) can be in electrical communication with the GFCI circuit 832. The indicator 836 can emit light with varying colors to indicate detection of a simulated ground fault during the self-test. The indicator 836 can be configured to blink, flash, emit light continuously, or initiate other effects. Depending on whether the GFCI circuit 832 detects the ground fault during the self-test, the indicator 836 can be configured to emit different light color or effect. For example, if the GFCI circuit 832 detects simulated ground fault during the self-test, the GFCI circuit 832 can transmit an electrical signal to the indicator 836 to emit green light for visual indication. However, and in further example, if the GFCI circuit 832 does not detect the simulated ground fault during the self-test, the indicator 836 can emit blinking red light, instead of non-blinking green light. In some implementations, the indicator 836 can correspond to, or perform one or more functions similar to, the first visual indicator 510 or the second visual indicator 512.

The self-test circuit 840 can include a test resistor 842, a ground-neutral ("GN") core 844, a differential core 848. The test resistor 842 creates a predetermined magnitude of current imbalance between phase and neutral conductors. The self-test circuit 840 can include any electrical components or circuitry elements, such as a resistor, a transistor, and one or more diodes. The self-test circuit 840 can be configured to simulate a ground fault. The self-test circuit 840 can be in electrical communication with the GFCI circuit 832. The self-test circuit 840 can receive an electrical signal from the GFCI circuit 832 to initiate self-testing in response to the GFCI circuit 832 receiving the signal to initiate a self-test. For example, the button 824 may be triggered, sending an electrical signal to the microcontroller 820 to initiate a self-test. Subsequently, the microcontroller 820 can transmit an electrical signal to the GFCI circuit 832 to initiate the self-test operation. Responsive to receiving the electrical signal, the GFCI circuit 832 can send an electrical signal to the self-test circuit 840 to initiate the self-test operation. In aspects, the self-test circuit 840 can correspond to, or perform one or more functions similar to, the fault simulation circuitry 214.

The GN core 844 can be used in connection with the differential core 848 for ground neutral condition detection. A ground neutral condition occurs when neutral and ground conductors are connected both on the line side and the load side of the differential core 848 and the GN core 844. This results in a conductive loop which then magnetically couples the differential core 848 and GN core 844 together. When this happens, the differential core 848 and GN core 844 create positive feedback which causes an amplifier coupled to the GFCI circuit 832 to oscillate. When the amplifier oscillates, the GFCI circuit 832 interprets this as a ground fault and the electrical communication between the power source and the load is removed. The differential core 848 can be used for ground fault condition detection.

While various aspects of the methods and systems have been described, these aspects are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary aspects and should be defined in accordance with the accompanying claims and their equivalents.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Reference to "can" may be construed as capability or ability of the subject, which is directly related to "can," for performing a task and further as one or more alternative aspects of the subject directly related to "can".

Any implementation disclosed herein may be combined with any other implementation or aspect, and references to "an implementation," "some implementations," "one implementation" or the like are not necessarily mutually exclusive and are intended to indicate that a particular feature, structure, or characteristic described in connection with the implementation may be included in at least one implementation or aspect. Such terms as used herein are not necessarily all referring to the same implementation. Any implementation may be combined with any other implementation, inclusively or exclusively, in any manner consistent with the aspects and implementations disclosed herein.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

What is claimed is:

1. A circuit interrupter device for selectively connecting a source of AC power from a line side to a load side of the circuit interrupter device, the circuit interrupter device comprising:
    a controller, powered by the source of AC power from the line side, configured to:
        initialize a self-test;
        determine whether the self-test was successful;
        output a self-test result signal based on whether the self-test was successful; and
    an electrically-held relay having an ON state and an OFF state, the electrically-held relay being in electrical communication with the controller and configured to:

remain in the OFF state until the self-test result signal indicates the self-test was successful; and transition to the ON state if the self-test result signal indicates the self-test was successful, wherein when in the OFF state, the load side of the circuit interrupter device is not in electrical communication with the source of AC power, and when in the ON state, the load side of the circuit interrupter device is in electrical communication with the source of AC power.

2. The circuit interrupter device of claim 1, further comprising:

a differential sensor configured to detect a current imbalance, wherein the self-test is determined to have been successful if a simulated current imbalance is detected by the differential sensor.

3. The circuit interrupter device of claim 2, further comprising:

a plurality of electrically conductive paths, wherein the differential sensor is configured to detect the current imbalance between the plurality of electrically conductive paths, wherein the electrical communication between the source of AC power and the load side of the circuit interrupter device is established by the plurality of electrically conductive paths, and wherein the self-test further comprises creating a simulated current imbalance between the plurality of electrically conductive paths.

4. The circuit interrupter device of claim 1, wherein:

the controller is a first controller and the circuit interrupter device further comprises a second controller in electrical communication with the first controller;

the first controller is configured to:
initialize the self-test;
determine whether the self-test was successful; and
output the self-test result signal based on whether the self-test was successful; and the second controller is configured to:
receive the self-test result signal from the first controller; and
if the self-test was successful, cause the electrically-held relay to enter the ON state.

5. The circuit interrupter device of claim 4, wherein the first controller is configured to initialize the self-test responsive to receiving a test initiation signal.

6. The circuit interrupter device of claim 4, wherein the second controller is configured to output a test initiation signal to the first controller upon receiving an input from a user, wherein the test initiation signal causes the first controller to initiate the self-test.

7. The circuit interrupter device of claim 4, further comprising a user-accessible button operatively coupled to the second controller, wherein an input from a user is an actuation of the user-accessible button.

8. The circuit interrupter device of claim 4, further comprising:

a filter circuit in electrical communication with the first controller and the second controller, wherein the filter circuit is configured to:
receive the self-test result signal from the first controller;
filter the self-test result signal; and
output the filtered self-test result signal to the second controller.

9. The circuit interrupter device of claim 1, further comprising:

a housing, wherein the circuit interrupter device is at least partially disposed within the housing; and an electrical plug configured to selectively establish electrical communication between the circuit interrupter device and the source of AC power.

10. The circuit interrupter device of claim 1, wherein the controller is further configured to initialize the self-test upon establishment of electrical communication between the line side of the circuit interrupter device and the source of AC power.

11. The circuit interrupter device of claim 1, wherein the controller is further configured to initialize the self-test periodically.

12. The circuit interrupter device of claim 1, further comprising:

a first switching element; and a second switching element electrically coupled in series with the first switching element, wherein the electrically-held relay is electrically coupled in series with one of the first switching element or the second switching element, wherein the controller is configured to control the electrically-held relay by energizing the first switching element, the second switching element, or both the first and second switching elements, and wherein upon failure of the first switching element, the second switching element, or both the first and second switching elements, the electrically-held relay is configured to be maintained in its OFF state.

13. The circuit interrupter device of claim 1, wherein the circuit interrupter device is mounted on a panel.

14. The circuit interrupter device of claim 13, further comprising a voltage measurement circuit configured to measure a magnitude of voltage of the AC power.

15. The circuit interrupter device of claim 14, wherein the AC power is removed when the measured magnitude is lower than a lower limit or greater than an upper limit.

16. The circuit interrupter device of claim 12, wherein one or more of the first and second switching elements is a transistor.

17. An apparatus to perform ground fault self-testing, comprising:

a first controller powered from a source of AC power from a line side and configured to:
receive, from a second controller, a signal to initialize a self-test;
determine that the self-test was successful; and
output a successful self-test result signal to the second controller responsive to determining that the self-test was successful;

a plurality of switching elements;

an electrically-held relay in electrical communication with the plurality of switching elements; and the second controller powered from the source of AC power from the line side and configured to:
output, to the first controller responsive to the apparatus that performs ground fault self-testing powering on, the signal to initialize the self-test;
receive, from the first controller, the successful self-test result signal; and
turn on the electrically-held relay that selectively establishes electrical communication between the source of AC power and a load based on the successful self-test result signal, wherein the electrically-held relay is powered from the source of AC power from the line side and is configured to selectively establish electrical communication between the source of AC power and the load if at least one of the plurality of switching elements is operational.

18. The apparatus of claim 17, further comprising:
a differential sensor configured to detect a current imbalance,
wherein the self-test is determined to have been successful if a simulated current imbalance is detected by the differential sensor.

19. The apparatus of claim 17, further comprising a reset-and-test button, wherein:
the second controller is configured to monitor a state of the reset-and-test button, and
the output of the successful self-test result signal to the second controller responsive to the determination that the self-test was successful comprises:
output of the signal to initialize the self-test responsive to a determination that the state of the reset-and-test button is that the reset-and-test button has been depressed.

20. The apparatus of claim 17, further comprising:
a first visual indicator that indicates that the self-test was successful; and
a second visual indicator that indicates that the self-test was not successful.

21. The apparatus of claim 20, wherein the first visual indicator comprises a green light-emitting diode (LED), and the second visual indicator comprises a red LED.

22. The apparatus of claim 17, further comprising a first switching element and a second switching element both connected in series to the electrically-held relay,
wherein the second controller is configured to control the electrically-held relay using the first switching element and the second switching element.

23. A method for selectively connecting a source of AC power from a line side to a load side of a circuit interrupter device, comprising:
initializing, by one or more controllers of the circuit interrupter device that are powered from the source of AC power from the line side, a self-test;
determining, by the one or more controllers, whether the self-test was successful;
outputting, by the one or more controllers, a self-test result signal based on whether the self-test was successful;
staying, by an electrically-held relay of the circuit interrupter device in electrical communication with the one or more controllers and powered from the source of AC power from the line side, in an OFF state until the self-test result signal indicates the self-test was successful, wherein when in the OFF state, the load side of the circuit interrupter device is not in electrical communication with the source of AC power, and when in the ON state, the load side of the circuit interrupter device is in electrical communication with the source of AC power; and
entering, by the electrically-held relay, an ON state if the self-test result signal indicates the self-test was successful.

24. The method of claim 23, wherein the one or more controllers comprise a first controller and a second controller in electrical communication with the first controller, and wherein the method further comprises:
initializing, by the first controller, the self-test;
determining, by the first controller, whether the self-test was successful;
outputting, by the first controller, the self-test result signal based on whether the self-test was successful;
receiving, by the second controller, the self-test result signal from the first controller; and
causing, by the second controller if the self-test was successful, the electrically-held relay to enter the ON state.

25. The method of claim 24, further comprising:
initializing, by the first controller, the self-test responsive to receiving a test initiation signal.

26. The method of claim 23, further comprising:
providing a housing, wherein the circuit interrupter device is at least partially disposed within the housing; and
providing an electrical plug configured to selectively electrically couple the circuit interrupter device to the source of AC power.

27. The method of claim 23, further comprising:
periodically initializing, by the one or more controllers, the self-test.

28. The apparatus of claim 17, wherein one or more of the switching elements of the plurality of switching elements is a transistor.

* * * * *